US009864528B2

(12) United States Patent
Vega-Gonzalez

(10) Patent No.: US 9,864,528 B2
(45) Date of Patent: Jan. 9, 2018

(54) DATA OBJECT OBSERVATION AMONG DOMAIN-RESTRICTED CONTAINERS

(71) Applicant: Microsoft Technology Licensing, LLC, Redmond, WA (US)

(72) Inventor: Eleazar Vega-Gonzalez, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 309 days.

(21) Appl. No.: 14/516,561

(22) Filed: Oct. 16, 2014

(65) Prior Publication Data

US 2016/0110123 A1   Apr. 21, 2016

(51) Int. Cl.
*H04L 12/26* (2006.01)
*G06F 3/06* (2006.01)
*H04L 29/08* (2006.01)
*H04L 12/24* (2006.01)

(52) U.S. Cl.
CPC ............ *G06F 3/0619* (2013.01); *G06F 3/065* (2013.01); *G06F 3/067* (2013.01); *H04L 43/06* (2013.01); *H04L 67/1095* (2013.01); *H04L 67/34* (2013.01); *H04L 41/08* (2013.01)

(58) Field of Classification Search
CPC ...... H04L 43/06; H04L 67/34; H04L 67/1095
USPC ......................................................... 709/225
See application file for complete search history.

(56) References Cited

U.S. PATENT DOCUMENTS

| | | | |
|---|---|---|---|
| 5,954,798 A | 9/1999 | Shelton et al. | |
| 6,671,757 B1 | 12/2003 | Multer et al. | |
| 6,892,245 B1 * | 5/2005 | Crump | H04L 29/12066 709/223 |
| 6,950,852 B1 | 9/2005 | Kobayaghi et al. | |
| 7,743,158 B2 * | 6/2010 | Fu | H04L 63/0218 709/217 |
| 8,751,737 B2 | 6/2014 | Bu et al. | |
| 8,769,127 B2 | 7/2014 | Selimis et al. | |

(Continued)

OTHER PUBLICATIONS

"Introduction to Web Storage", Published on: Sep. 22, 2013, pp. 3 Available at http://msdn.microsoft.com/en-us/library/ie/bg142799(v=vs.85).aspx.

(Continued)

*Primary Examiner* — Adnan Mirza

(74) *Attorney, Agent, or Firm* — Merchant & Gould P.C.

(57) ABSTRACT

A device may feature a set of containers from different domains, where the containers are restricted from interoperation due to domain restrictions. The device may provide a communication interface that enables simple communication between containers, such as string-based message-passing. While adequate for some uses, it may be difficult to utilize the communication interface in an ad-hoc manner for more complex uses, such as enabling a first container to observe state changes in an object within a second container. Instead, the device may receive a request by an observing container to create an observed container that is associated with a different domain, and to observe a data object within the observed container. Accordingly, the device may monitor the data object on behalf of the observing domain, and upon detecting an update, may transmit a notification of the update to the observing domain through the communication interface between the domain-restricted containers.

20 Claims, 7 Drawing Sheets

(56) References Cited

U.S. PATENT DOCUMENTS

2012/0275553 A1  11/2012  Lehane et al.

OTHER PUBLICATIONS

"Frame Lock", Published on: Jan. 31, 2012, pp. 3 Available at: http://www.nvidia.in/object/IO_10794.html.

West, Matt, "Cross-Domain Messaging With postMessage", Published on: Sep. 12, 2013, pp. 8 Available at: http://blog.teamtreehouse.com/cross-domain-messaging-with-postmessage.

Kantor, Ilya, "Cross-Window Messaging with postMessage", Published on: Apr. 20, 2011, pp. 4 Available at: http://javascript.info/tutorial/cross-window-messaging-with-postmessage.

"Window.postMessage", Retrieved on: Sep. 1, 2014, pp. 6 Available at: https://developer.mozilla.org/en-US/docs/Web/API/window.postMessage.

Papadopoulos, et al., "Evaluation of Message Passing Synchronization Algorithms in Embedded Systems", In Proceedings of International Conference on Embedded Computer Systems: Architectures, Modeling, and Simulation, Jul. 14, 2014, 8 pages. http://excess-project.eu/publications/published/samos2014.pdf.

\* cited by examiner

DATA OBJECT OBSERVATION AMONG DOMAIN-RESTRICTED CONTAINERS

BACKGROUND

Within the field of computing, many scenarios involve the provision of a set of containers in a computing environment that are respectively restricted to a domain. As a first such example, a web page presented within a web browser may include an iframe that presents content retrieved from a network domain, and that is only permitted by the web browser to access other resources from the same network domain. As a second such example, an untrusted application retrieved from an application source may be executed within a virtual machine container, and may be restricted from communicating with any network domain other than the application source.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

While the restriction of containers to communicate only with particular domains may generally promote the security of the computing environment, some circumstances may arise in which such restriction interferes with helpful communication. As a first such example, an application may be provided with various components served from different domains. For example, an organization may provide an application that is intended to utilize an email client for the same organization, but the email client may have been provided from a different domain. As a second such example, a first iframe that presents some content may have actually requested the creation of a second iframe that presents some additional content from a different domain. However, even if the first domain and the second domain represent the same organization, the application of domain restriction to the iframe containers may interfere with the interoperation of the iframes.

Some techniques may be provided that enable a limited degree of interaction between such containers. For example, a communication interface may be provided that permits a limited type of communication, such as passing string-based messages between the containers. Such communication interfaces may be satisfactory for simple messaging, but may be difficult to utilize for more involved uses. In particular, it may be desirable for a first container to observe changes to the state of a data object within a second container. While the frames may be designed to send and receive notifications through the communication interface, the code provided to detect, transmit, receive, and apply such notifications may be unexpectedly difficult to implement, due to issues such as notification throttling, prioritization, concurrency and versioning conflicts, and serialization. Moreover, the implementation of such notification techniques to monitor various data objects for a project may not readily scale to larger architectures; e.g., resource utilization and latency may be exacerbated by the use of ad-hoc techniques to synchronize a diverse set of data objects among a large set of containers utilizing the communication interface.

Presented herein are techniques for enabling devices to coordinate the interoperation of domain-restricted containers, and particularly with the observation by a first container of data objects within a second container. In such scenarios, an observing container that is associated with, and hence restricted to, a first domain may request the creation of an observed container that is associated with and restricted to a second domain. The device may create the observed container on behalf of the observing container, and may provide a communication interface between the observing container and the observed container, such as a message-passing communication interface that enables the exchange of string-based messages. Additionally, the observing container may initiate a request to observe a data object within the observed container. The device may monitor of the data object within the observed container on behalf of the observing container; and upon detecting an update of the data object, the device may utilize the communication interface to notify the observing container regarding the update of the data object. In this manner, the device may provide an extension of the communication interface to enable the observing container to observe the data object within the observed domain while respecting the domain-restrictions of the respective containers, in accordance with the techniques presented herein.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
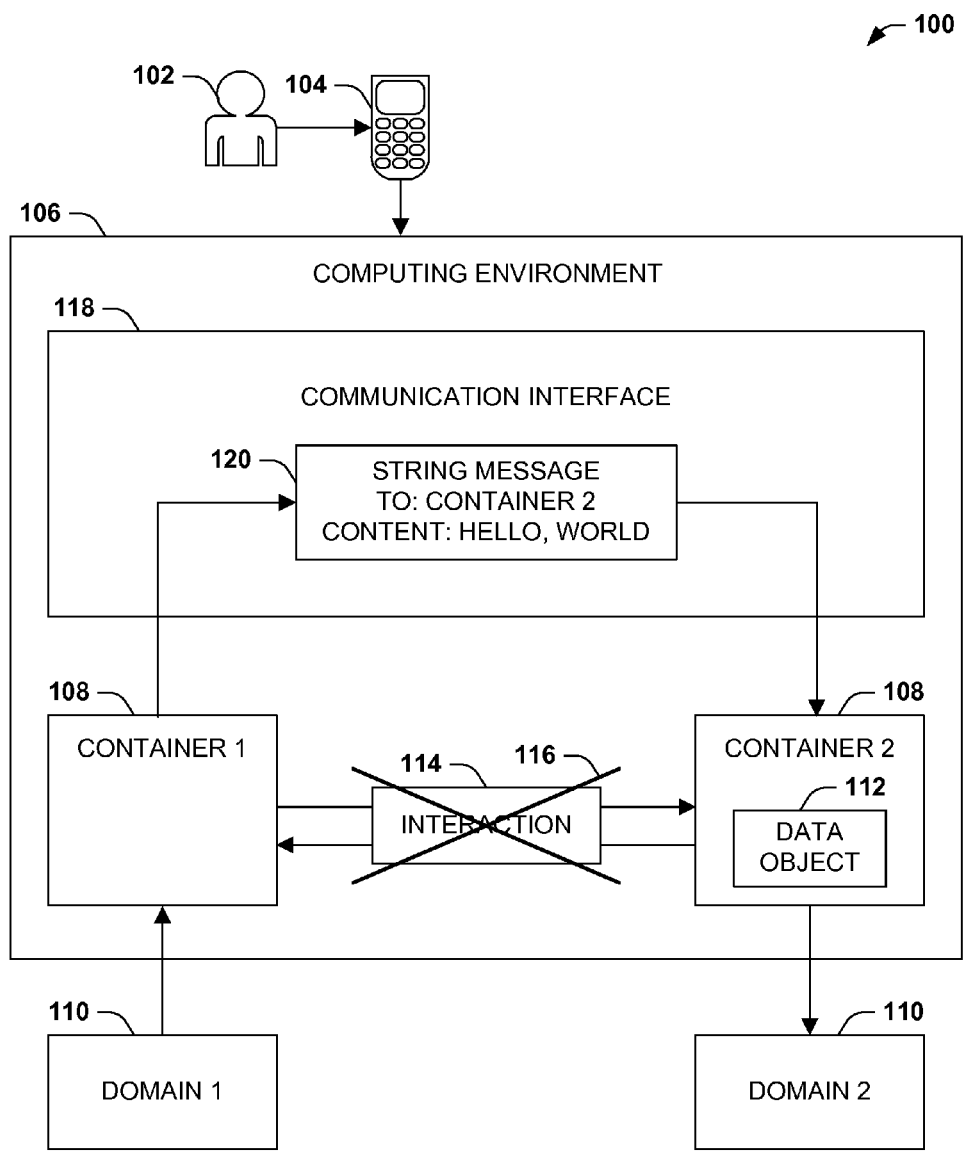
FIG. 1 is an illustration of an example scenario featuring a set of domain-restricted containers communicating within a computing environment of a device.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A. Introduction

FIG. 1 is an illustration of an example scenario 100 featuring a device 104 of a user 102 that provides a computing environment 106 featuring set of domain-restricted containers 108. As a first such example, the computing environment 106 may comprise a web browser, and the containers 108 may comprise a portion of a web page or web application, such as a hypertext markup language (HTML) iframe element that encapsulates a script provided in a script language (e.g., Javascript, Perl, or Python) that is retrieved from a domain 110 and evaluated by an interpreter. As a second such example, the computing environment 106 may comprise a virtual machine, such as a Java virtual machine, within which a running process is executing untrusted code that has been retrieved from and/or signed by a domain 110. As a third such example, the computing environment 106 may comprise an operating system utilizing code that has been retrieved from a domain 110 and that is executed within an isolation construct, such as a limited set of privileges to utilize the resources of the device 104, and restrictions from otherwise utilizing the device 104 or communicating with other applications.

In scenarios such as the example scenario 100 of FIG. 1, the device 104 and/or computing environment 106 may apply a domain restriction to the respective containers 108, which permits the container 108 to communicate with the domain 110 that is associated with the container 108 (e.g., a server or server set from which the iframe contents, script, or executable code have been received), but that restricts the container 108 from communicating with any other domain 110. The domain restriction may also extend to communication with other containers 108; e.g., a first container 108 may be permitted to communicate with a second container 108 that is associated with the same domain 110, but may be restricted from communicating with a third container 108 that is associated with a different domain 110, and vice versa. In some such scenarios, the domain restriction may even restrict the first container from discovering the existence of the third container 108 in order to apply a policy of isolation of resources to the respective domains 110.

While domain restrictions may generally promote the security of the device 104 and the computing environment 106, such policies may also interfere with desirable interoperation of containers 108. For example, a web application may present components that are served by different domains 110, and that are executed within different containers 108 within the computing environment 106. As one such example, an organization may feature a locally developed application that includes an email interface; however, the organization's email service may be provided by a third party, which may provide a component from a domain 110 that is different than the domain 110 of the organization from which the web application is provided. However, the web application may desirably enable the various components represented in the respective containers 108 to engage in an interaction 114 in the context of providing the web application to the user 102, but such interaction 114 may be blocked by a domain restriction 116, due to the association of the containers 108 with different domains 110.

In order to alleviate such restrictions, the computing environment 106 may provide a communication interface 118 that allows the respective containers 108 to communicate in a limited and observable manner. For example, the communication interface 118 may enable strings to be transmitted by a first container 108 and addressed to a second container 108. The string data may be observable and evaluated by the computing environment 106 to detect misuse, such as the transmission of malicious code from the first container 108 to the second container 108, and may enable limits on the content of messages, such as limits on size or encoding mechanisms. Additionally, structuring the communication interface 118 according to a message-passing model may enable containers 108 to disregard unexpected or unwanted messages. Accordingly, in the example scenario 100 of FIG. 1, the first container 108 may transmit a message 120 to the second container 108 through the communication interface 118, such as a string, and the second container 108 may choose to accept and/or utilize the message 120.

A string-based communication interface 118 such as provided in the example scenario 100 of FIG. 1 may be suitable for many uses, such as simple messages or commands exchanged between comparatively simple containers 108. However, in other scenarios, the communication interface 118 may provide inadequate support for the interaction 114 of the containers 108. For example, the second container 108 may feature a data object 112, such as a primitive value, a class instance, a database record such as a tuple, or a file, that the first container 108 wishes to observe.

In order to address such deficiencies, a designer of a shared application may design the first container 108 and the second container 108 to support such interaction using the communication interface 118, e.g., by configuring the first container 108 to send a message 120 to the second container 108 to observe the data object 112, and having the second container 108 send notifications to the first container 108 through the communication interface 118 when the data object 112 is updated. However, the ad hoc design of this mechanism by a designer of the containers 108 may present an unexpectedly difficult challenge. First, the designer of such a mechanism may encounter and contend with problems such as notification throttling (e.g., limiting the number of messages 120 sent through the communication interface 118 from the second container 108 to the first container 108 as the data object 112 rapidly changes); prioritization (e.g., determining which updates of the data object 112 warrant the transmission of a message 120, and which notification to send first when several data objects 112 are concurrently updated); concurrency and versioning conflicts (e.g., determining an outcome when several updates of the data object 112 occur concurrently); and serialization (e.g., determining how to encode data objects 112 exhibiting a complex structure, such as a set of interconnected objects). Second, the ad hoc exchange of messages 120 to coordinate the containers 108 while contending with a single data object 112 may not scale adequately to satisfy the coordination of a diverse set of data objects 112 may a large number of containers 108. For example, if many containers 108 share access to a large number of rapidly changing data objects 112, the communication interface 118 may become saturated with messages 120, resulting in diminished performance, exacerbated latency, and inefficiency. A designer of the content of the containers 108 may be unprepared to address such complex issues while formulating an ad hoc coordination of the containers 108 through the communication interface 118.

B. Presented Techniques

Figure 2:
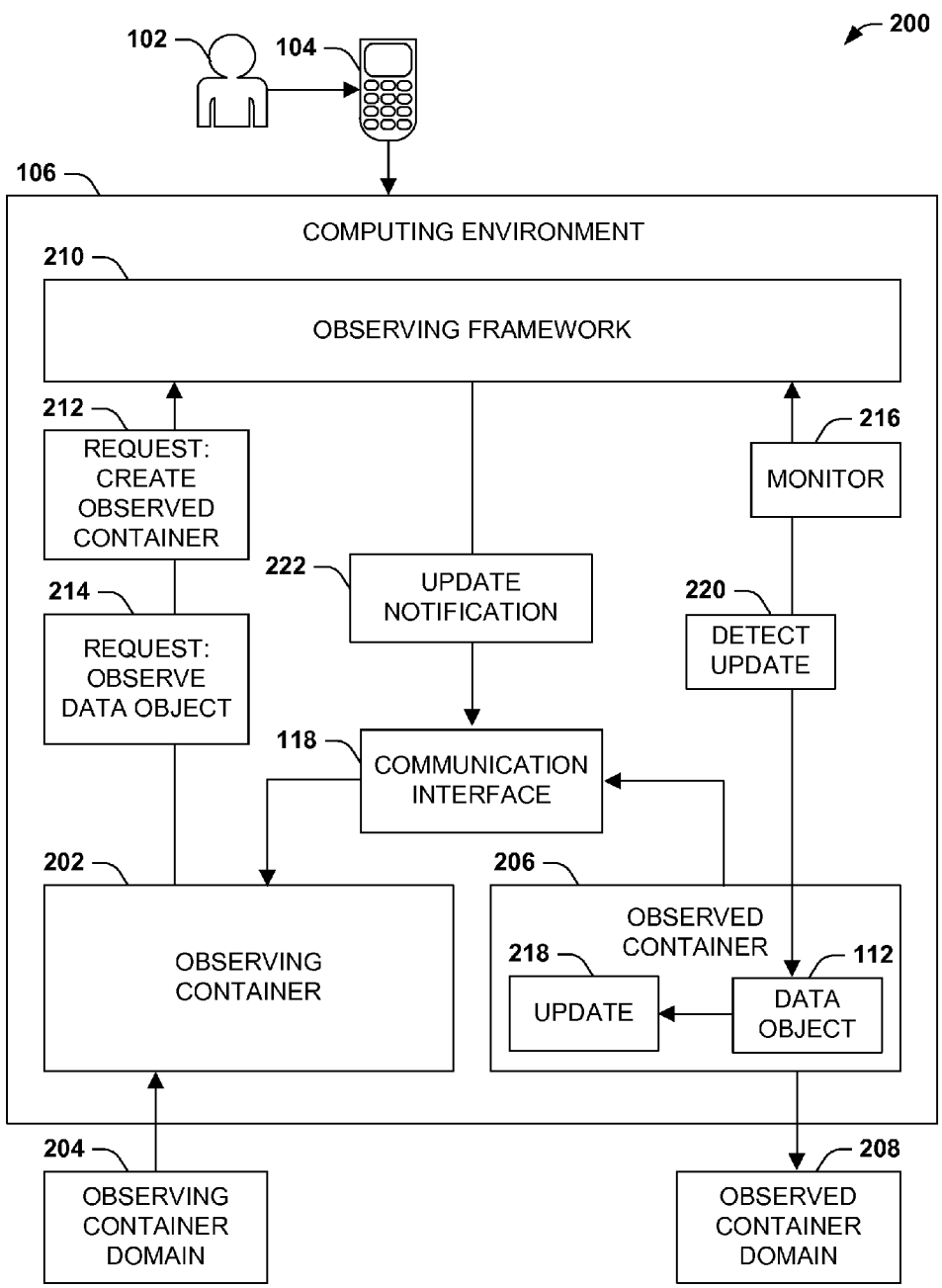
FIG. 2 is an illustration of an example scenario featuring a device coordinating a set of domain-restricted containers in accordance with the techniques presented herein.

FIG. 2 presents an illustration of an example scenario 200 featuring a coordination of a set of domain-restricted containers 108 within a computing environment 106 of a device 104 in accordance with the techniques presented herein.

In the example scenario 200 of FIG. 2, the computing environment 106 of the device 104 features an observing container 202, which has been received from an observing container domain 204. For example, the observing container domain 204 may comprise an organization or server that has provided the content of the observing container 202 to the device 104, and/or that has signed or otherwise verified the integrity of the observing content 202. The observing container 202 may initiate a creating request 212 to create an observed container 206, which may be associated with an observed container domain 208. For example, the observing container 202 may provide a creating request 212 that specifies a uniform resource identifier (URI) of the content of the observed container 206, and a creating request 212 that the computing environment 106 create the observed container 206 for the specified content. The device 104 may fulfill the creating request 212 by creating the observed container 206, and by providing a communication interface 118 that enables communication between the observing container 202 and the observed container 206 within the device 104.

As further illustrated in the example scenario 200 of FIG. 2, the observing container 202 may initiate an observing request 214 to observe a data object 112 within the observed container 206. The observing framework 210 may fulfill the observing request 214 by monitoring 216 the data object 112 within the observed container 206 to detect an update 218 of the data object 112 (e.g., a modification, deletion, cloning, or relocation of the data object 112). Upon detecting such an update, the observing framework 210 may issue an update notification 222 to the observing container 202 through the communication interface 118. The update notification 222 may comprise, e.g., simply a notification that the data object 112 has been updated, and/or information about the update 218 of the data object 112, such as a delta of the contents of the data object 112. Moreover, the observing container 202 may utilize the update notification 222 in various ways, such as presenting the notification to a process executing within the observing container 202; invoking a function handler of the observing container 202 to handle the update notification 222; and/or applying the update 218 to a version of the data object 112 stored within the observing container 202. In this manner, the observing framework 210 may utilize the communication interface 118 between the observing container 202 and the observed container 206 to coordinate the containers with respect to the data object 112 in accordance with the techniques presented herein.

C. Technical Effects

The use of the techniques presented herein to coordinate containers may result in a variety of technical effects.

As a first example of a technical effect that may be achievable by the techniques presented herein, a device 104 may facilitate the development of the containers 108, e.g., by alleviating a developer of the development of ad hoc mechanisms to synchronize a data object 112 among containers 108. It may be appreciated that this task may pose a significant number of challenges, such as performance, prioritization, concurrency, and version conflicts. Providing an observing framework 210 on the device 104 may enable any pair of interoperating containers 108 to coordinate with respect to updates 218 to a data object 112, without the developer having to develop and maintain such mechanisms.

As a second example of a technical effect that may be achievable by the techniques presented herein, the transmission of update notifications 222 in the manner illustrated in the example scenario 200 of FIG. 2 may be compatible with the current resources and configuration of computing environments 106, and currently established communication standards. As a first such example, the techniques presented here may utilize a communication interface 118 that already exists within the computing environment 106, and that is already provided to connect containers 108 within the computing environment 106 (e.g., utilizing an existing messaging channel that devices 104 already and automatically establish between the containers 108). As a second such example, the techniques presented herein may transmit update notifications 222 according to the established standards of the communication interface 118 (e.g., using a string-based communication channel with which developers may already be familiar, rather than implementing a new communication channel that is not familiar to developers). As a third such example, the observing framework 210 may be implemented using currently existing programming languages and interface (e.g., as an extension of Javascript).

As a third example of a technical effect that may be achievable by the techniques presented herein, an observing framework 210 provided on behalf of various containers 108 on the device 104 may achieve greater efficiency in the coordination of containers 108 than a set of ad hoc techniques that individually coordinate a limited number of containers 108. As a first such example, a first ad hoc technique may coordinate data between an observing container 202 and a first observed container 206, and a second ad hoc technique may coordinate data between the observing container 202 an a second observed container 206. However, if a data object 112 within the first observed container 206 changes rapidly, the communication interface 118 may be saturated with update notifications 222 from the first observed container 206, while update notifications 222 from the second observed container 206 may not be timely received. Individual ad hoc mechanisms may not be aware of each other's existence or the use of the communication interface 118 for other uses, and may therefore not be able to interoperate to balance the delivery of update notifications 222 from each observed container 206. However, an observing framework 210 as provided herein, which handles observing requests 214 from various observing containers 202 to observe various observed containers 206, may holistically evaluate all such requests and the delivery of update notifications 222 arising therefrom, and may therefore achieve a more balanced sharing of the communication interface 118 among containers 108 that facilitates the efficiency, performance, and scalability of architectures utilizing such domain-restricted containers 108. Such holistic evaluation may also enable the observing framework 210 to provide additional features, such as concurrent access; exclusive access, such as in a transaction; and broad-spectrum observation, where many observing containers 202 observe a particular data object 112 of an observed container 206, and/or where an observing container 202 observes a large number of data objects 112 within a large number of observed containers 206. These and other technical effects may be achievable through the configuration of the device 104 to coordinate containers in accordance with the techniques presented herein.

D. Example Embodiments

Figure 3:
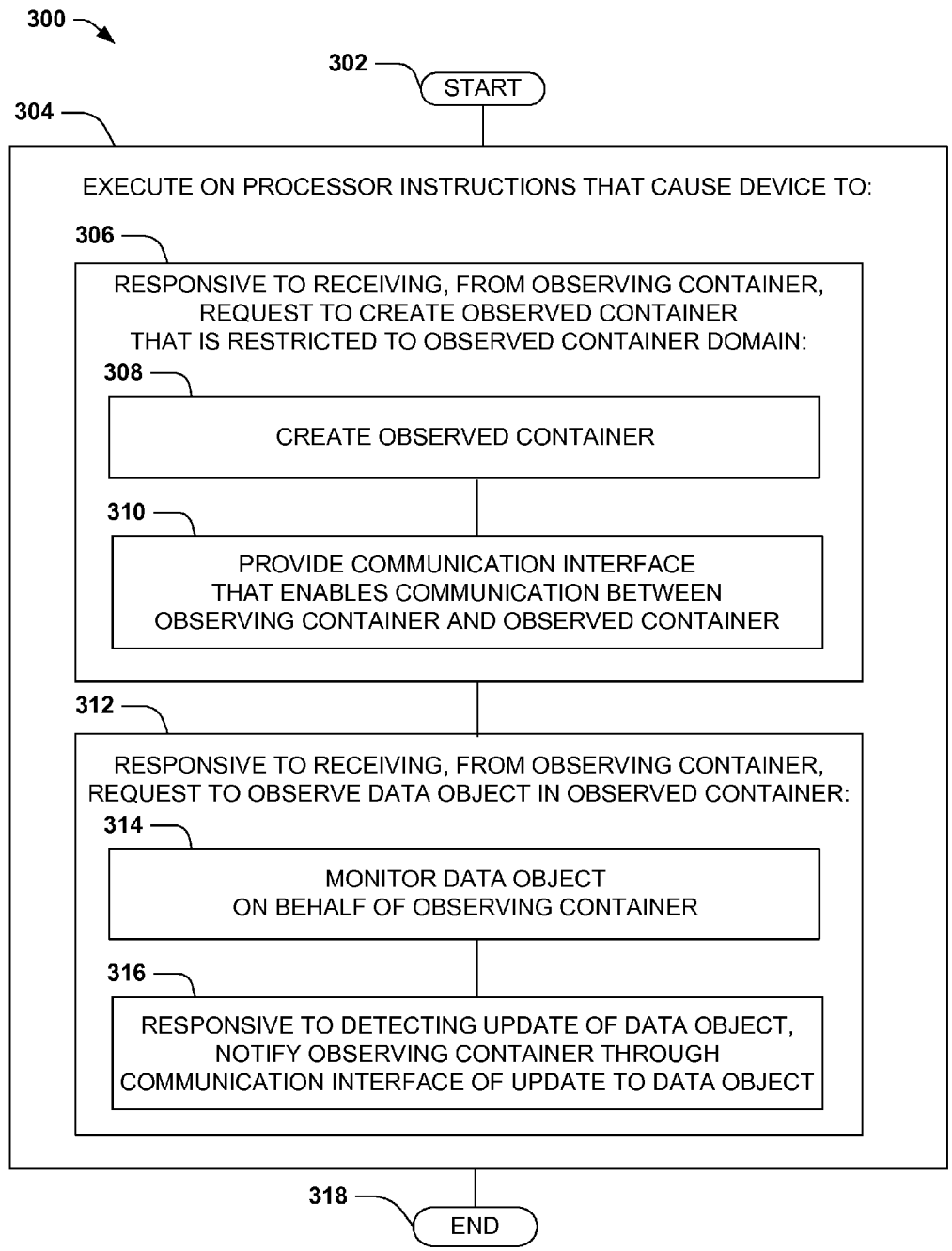
FIG. 3 is a flow diagram of an example method of coordinating a set of domain-restricted containers, in accordance with the techniques presented herein.

FIG. 3 presents a first example embodiment of the techniques presented herein, illustrated as an example method 300 of configuring a device 104 to coordinate containers 108 within the computing environment 106. The example method 300 may be implemented, e.g., as a set of instructions stored in a memory component of the device 104, such as a memory circuit, a platter of a hard disk drive, a solid-state storage device, or a magnetic or optical disc, and organized such that, when executed on a processor of the device, cause the device 104 to operate according to the techniques presented herein.

The example method 300 begins at 302 and involves executing 304 the instructions on a processor of the device. Specifically, executing 304 the instructions on the processor causes the device 104 to, responsive to receiving 306, from an observing container 202 that is restricted to an observing container domain 204, a creating request 212 to create an observed container 206 that is restricted to an observed container domain 208, create 308 the observed container 206, and provide 310 a communication interface 118 that enables communication between the observing container 202 and the observed container 206 within the device 104. Executing 304 the instructions on the processor further causes the device 104 to, responsive to receiving 312 an observing request 214 from the observing container 108 to observe a data object 112 within the observed container 206, monitor 314 the data object 112 on behalf of the observing container 206; and responsive to detecting an update 218 of the data object 112 within the observed container 206, notify 316 the observing container 202 through the communication interface 118 of the update 218 of the data object 112. In this manner, executing the instructions causes the device 104 to coordinate containers 108 within the computing environment 106 in accordance with the techniques presented herein, and so ends at 318.

Figure 4:
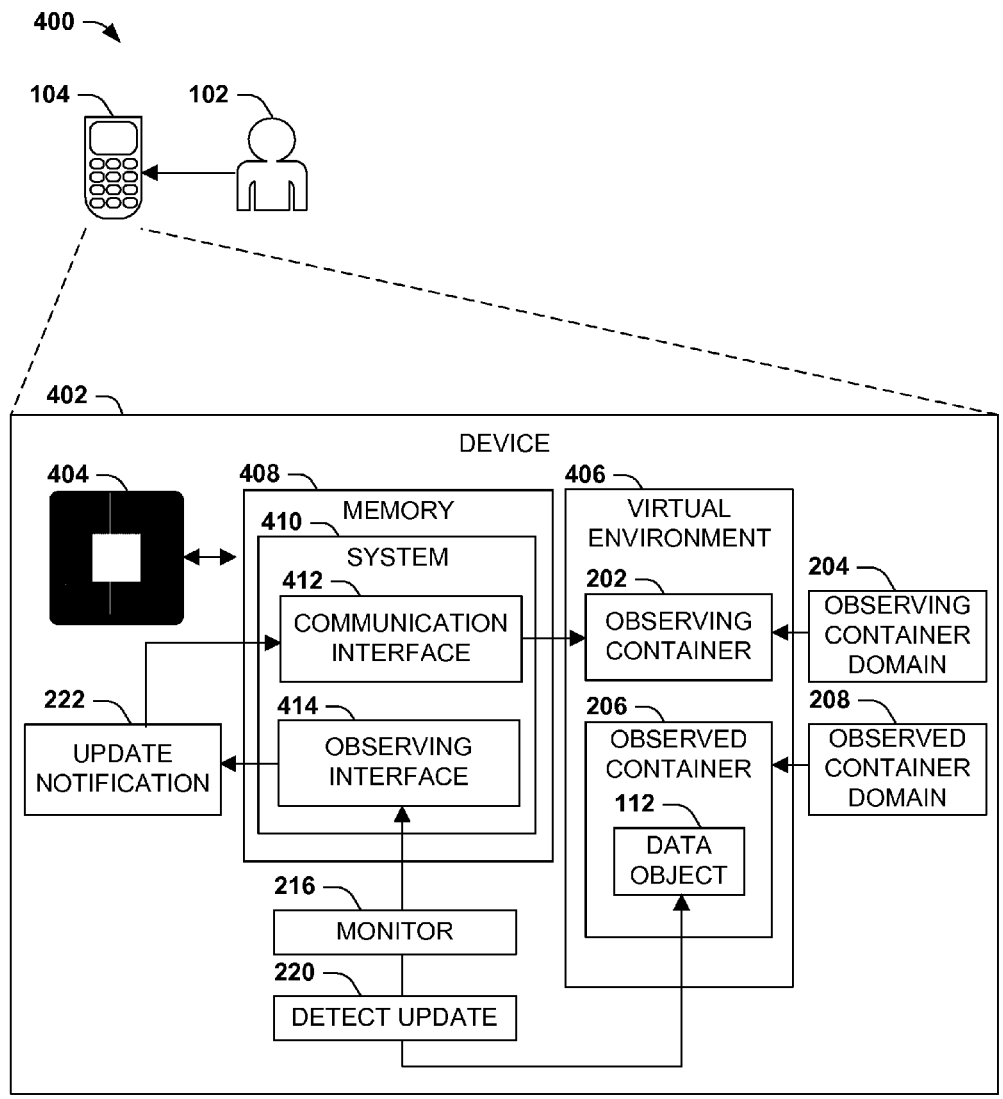
FIG. 4 is a component block diagram of an example system provided to coordinate a set of domain-restricted containers, in accordance with the techniques presented herein.

FIG. 4 presents a second example embodiment of the techniques presented herein, illustrated as an example system 408 implemented on an example device 402 featuring a processor 404, a memory 408, and a virtual environment 406, such as a web browser or an application sandbox, that includes two containers 108. Specifically, the virtual environment 406 hosts an observing container 202 that is restricted to an observing container domain 204, and that provides a service to the device 402 through interaction with an observed container 206 that is restricted to an observed container domain 208. The memory 408 further comprise an example system 410 that causes the example device 402 to coordinate the containers 108 within the virtual environment 406 in accordance with the techniques presented herein. The example system 410 may be implemented, e.g., as a set of components respectively comprising a set of instructions stored in the memory 408 of the device 402, where the instructions of respective components, when executed on the processor 404, implement components of the example system 410 that together cause the device 402 to operate in accordance with the techniques presented herein.

The example system 410 comprises a communication interface 412, which enables communication between the observing container 202 and the observed container 206 within the example device 402. The example system 410 also comprises an observing interface 414, which, responsive to receiving an observing request 214 from the observing container 202 to observe a data object 202 within the observed container 206, monitors 216 the data object 202 on behalf of the observing container 202; and, responsive to detecting 220 an update 218 of the data object 202 within the observed container 206, notifies the observing container 202 through the communication interface 412 of the update 218 of the data object 202. In this manner, the example system 410 enables the example device 402 to coordinate the containers 108 provided within the virtual environment 406 in accordance with the techniques presented herein.

Still another embodiment involves a computer-readable medium comprising processor-executable instructions configured to apply the techniques presented herein. Such computer-readable media may include various types of communications media, such as a signal that may be propagated through various physical phenomena (e.g., an electromagnetic signal, a sound wave signal, or an optical signal) and in various wired scenarios (e.g., via an Ethernet or fiber optic cable) and/or wireless scenarios (e.g., a wireless local area network (WLAN) such as WiFi, a personal area network (PAN) such as Bluetooth, or a cellular or radio network), and which encodes a set of computer-readable instructions that, when executed by a processor of a device, cause the device to implement the techniques presented herein. Such computer-readable media may also include (as a class of technologies that excludes communications media) computer-computer-readable memory devices, such as a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD-R, DVD-R, or floppy disc), encoding a set of computer-readable instructions that, when executed by a processor of a device, cause the device to implement the techniques presented herein.

Figure 5:
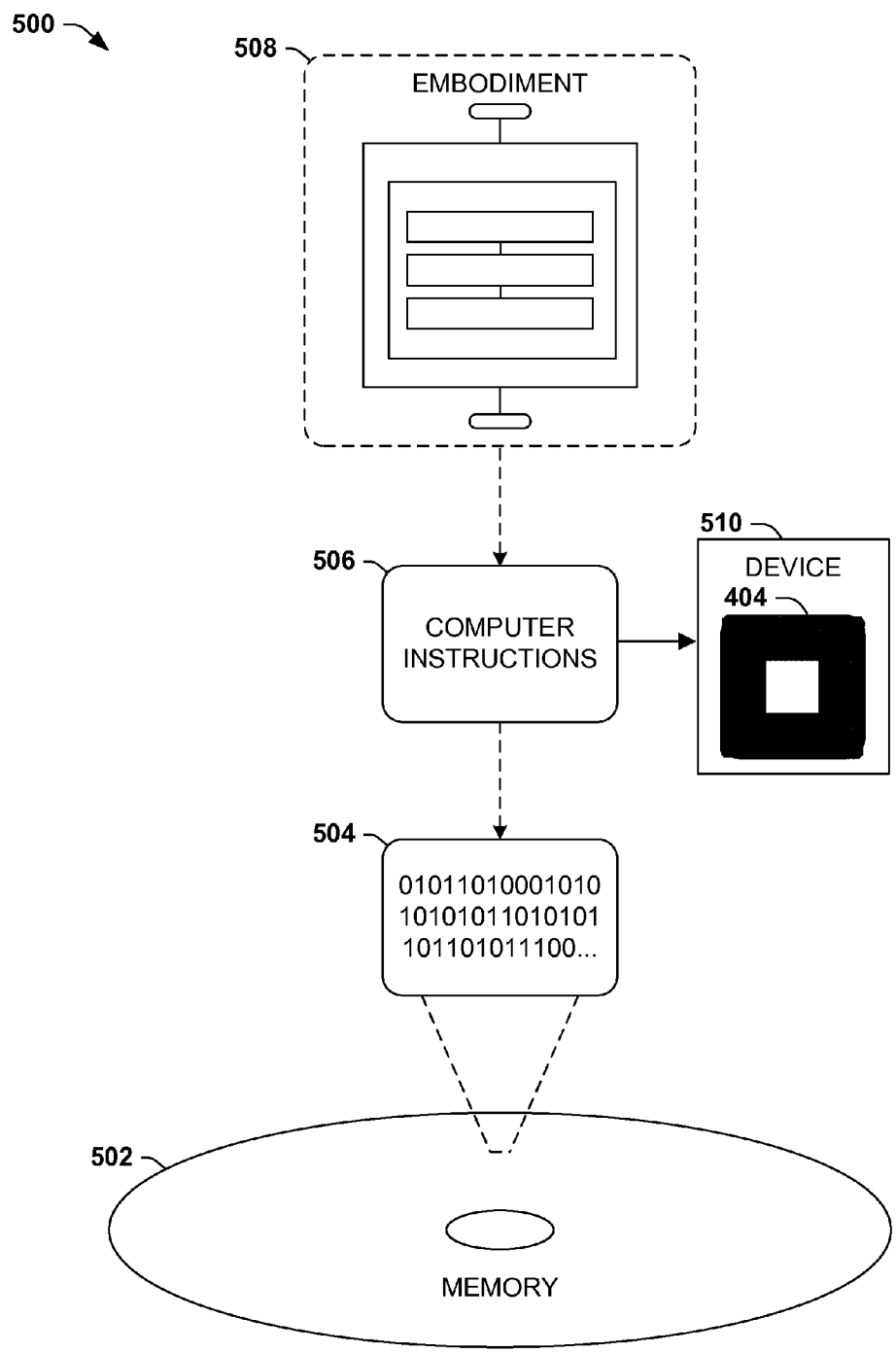
FIG. 5 is an illustration of an example computer-readable medium comprising processor-executable instructions configured to embody one or more of the provisions set forth herein.

An example computer-readable medium that may be devised in these ways is illustrated in FIG. 5, wherein the implementation 500 comprises a computer-readable memory device 502 (e.g., a CD-R, DVD-R, or a platter of a hard disk drive), on which is encoded computer-readable data 504. This computer-readable data 504 in turn comprises a set of computer instructions 506 that, when executed on a processor 404 of a device 510, cause the device 510 to operate according to the principles set forth herein. In a first such embodiment, the processor-executable instructions 506 may cause the device 510 to perform a method of coordinating domain-restricted containers, such as the example method 300 of FIG. 3. In a second such embodiment, the processor-executable instructions 506 may cause the device 510 to implement a system that coordinates domain-restricted containers 108, such as the example system 410 of FIG. 4. Many such computer-readable media may be devised by those of ordinary skill in the art that are configured to operate in accordance with the techniques presented herein.

E. Variations

The techniques discussed herein may be devised with variations in many aspects, and some variations may present additional advantages and/or reduce disadvantages with respect to other variations of these and other techniques.

Moreover, some variations may be implemented in combination, and some combinations may feature additional advantages and/or reduced disadvantages through synergistic cooperation. The variations may be incorporated in various embodiments (e.g., the example method 300 of FIG. 3; the example system 410 of FIG. 4; and the example memory device 502 of FIG. 5) to confer individual and/or synergistic advantages upon such embodiments.

E1. Scenarios

A first aspect that may vary among embodiments of these techniques relates to the scenarios wherein such techniques may be utilized.

As a first variation of this first aspect, the techniques presented herein may be utilized to achieve the configuration of a variety of devices 104, such as workstations, laptops, tablets, mobile phones, game consoles, portable gaming devices, portable or non-portable media players, media display devices such as televisions, appliances, home automation devices, computing components integrated with a wearable device integrating such as an eyepiece or a watch, and supervisory control and data acquisition (SCADA) devices.

As a second variation of this first aspect, the techniques presented herein may be utilized with many types of computing environments 106 and many types of containers 108 provided therein that are restricted to a particular domain 110. As a first such example, the computing environment 106 may comprise a web browser, and the containers 108 may comprise a portion of a web page or web application, such as a hypertext markup language (HTML) iframe element that encapsulates a script provided in a script language (e.g., Javascript, Perl, or Python) that is retrieved from a domain 110 and evaluated by an interpreter. As a second such example, the computing environment 106 may comprise a virtual machine, such as a Java virtual machine, within which a running process is executing untrusted code that has been retrieved from and/or signed by a domain 110. As a third such example, the computing environment 106 may comprise an operating system utilizing code that has been retrieved from a domain 110 and that is executed within an isolation construct, such as a limited set of privileges to utilize the resources of the device 104, and restrictions from otherwise utilizing the device 104 or communicating with other applications.

As a third variation of this first aspect, the techniques presented herein may be utilized with many types of data objects 112, such as primitive variables; instances of classes; records in a database; tuples in an unstructured data store; or files in a file system. Additionally, the updates 218 of such data objects 112 may comprise many types of updates to the data object 112, such as a creation, modification, expansion, contraction, renaming, relocation, duplication, or deletion of the data object 112 and/or the metadata of the data object 112.

As a fourth variation of this first aspect, many types of communication interfaces 118 may be utilized to convey the update notifications 222 of updates 218 to the observing container 202. As a first such example, the communication interface 118 may comprise a string-based messaging system that enables the delivery of string messages to the observing container 202, optionally including a message queue that presents a queue of messages to the observing container 202. As a second such example, the communication interface 118 may comprise a remote procedure call (RPC) mechanism, wherein the observation of the update 218 causes an invocation of a handler of the observing container 202.

As a fifth variation of this first aspect, the observing framework 210 may be included in the computing environment 106 in various ways. As a first such example, the observing framework 210 may comprise an extension of the communication interface 118, e.g., a wrapper that provides additional capabilities and functionality of the communication interface 118 involving the observation of updates 218 to data objects 112. As a second such example, the observing framework 210 may comprise an extension of a container 108, e.g., an isolation construct within which enclosed content (such as Javascript) may be executed, and that the enclosed content may invoke to participate in the observing framework 210 as an observing container 202 and/or as an observed container 206. As a third such example, the observing framework 210 may be provided by a virtual environment 406 and/or the computing environment 106, e.g., as an application programming interface (API) that a container 108 may invoke to participate in the observing framework 210. These and other scenarios may be suitable for the coordination of domain-restricted containers 108 in accordance with the techniques presented herein.

E2. Observing Requests

A second aspect that may vary among embodiments of the techniques presented herein involves the receipt and response to observing requests 214 by an observing container 202 to observe a data object 112 within an observed container 206. In accordance with this second aspect, many techniques may be utilized whereby an observing container 202 may request the creation of an observed container 206; may discover and/or participate in the creation of a data object 112 within the observed container 206 that the observing container 202 wishes to monitor; and the observing request 214 to observe the data object 112.

As a first variation of this second aspect, an observing framework 210 may receive a creating request 212 from an observing container 202 that also specifies an observed container content of the observed container 206, including the data object 112. As a first such example, the observing container 202 may provide functionality, such as a script, to be evaluated within the observed container 206, where the script includes a reference to the data object 112, and also specifies the observed container domain 208 to which the observed container 206 is to be restricted. As a second such example, the observing container 202 may provide a uniform resource identifier (URI) within the observed container domain 208, wherein the URO specifies the location of executable code that is to be executed within the observed container 206. Accordingly, the observing framework 210 may receive the creating request 212 from the observing container 202 to create the observed container 206 including the observed container content, including the data object 112 (e.g., by loading the observed container content from a content location, and creating the observed container 206 according to the observed container content).

As a second variation of this second aspect, an observing container 202 may further comprise an observing container version of the data object 112, such as a mirror of the data object 112 stored in the observed container 206, and may initiate a request to synchronize the data object 112 of the observed container 206 with the observing container version of the data object 112. The synchronization may be bidirectional (e.g., enabling updates to the observing container version of the data object 112 to be propagated to the data object 112 within the observed container 206) and/or unidirectional (e.g., only allowing updates 218 to the data object 112 within the observed container 206 to be reflected in the observing container version), such as in the manner of a cached version of the data object 112. Accordingly, the observing framework 210 may receive and store the request to synchronize the data object 112 and the observing container version of the data object 112, e.g., in order to inform the handling of updates 218 of the data object 112 detected after receiving the synchronization request. Alternatively or additionally, the observing framework 210 may receive the request and provide a copy of the data object 112 (e.g., enabling the observing container 202 to poll the data object 112 for updates 218, e.g. at the request of the observing container domain 204).

As a third variation of this second aspect, the observing framework 210 may detect one or more data objects 112 within the observed container 206 that are available for monitoring on behalf of the observed container 202. Such detection may be performed, e.g., by detecting data objects 112 present within and/or specified by the observed container content of the observed container 206; by detecting the creation of data objects 112 within the observed container 206 (e.g., by a script evaluated within the observed container 206); and/or by receiving an offer from the observed container 206 to make a particular data object 112 available for observation by observing containers 202. Accordingly, the observing framework 210 may notify the observing container 202 of the availability of observable data objects 112 upon request of the observing container 202 (e.g., providing a catalog of observable data objects 112 to the observing container 202), and/or upon detecting the creation and/or availability of the data object 112 (e.g., upon receiving a notification of an observable data object 112 within an observed container 206, the observing framework 210 may transmit the notification to the observing container 202).

As a fourth variation of this second aspect, the observing framework 210 may observe the data object 112 of an observed container 206 on behalf of any observing container 202 within the computing environment 106. Alternatively, the observing framework 210 may limit such observation to the observing container 202 that created the observed container 206, and may refuse observing requests 214 received from other containers 108. For example, an observing container 202 may be permitted to observe data objects 112 only within containers 108 that have a particular relationship with the observing container 202 (e.g., a parent/child relationship, such as an observed container 206 that was created by the observing container 202), and/or upon receiving consent by the observed container 206 to allow the observing container 202 to observe the data object 112. Accordingly, the observing framework 210 may perform such observation only on behalf of the observing container 202 that initiated the creating request 212 to create the observed container 206; and responsive to receiving an observing request 214 from an observing container 202 to observe a second data object 112 in a second container 108 that is not associated with the observing container domain 204 and was not created by the observing container 202, the observing framework 210 may refuse the observing request 214 by the observing container 202 to observe the second container 206.

Figure 6:
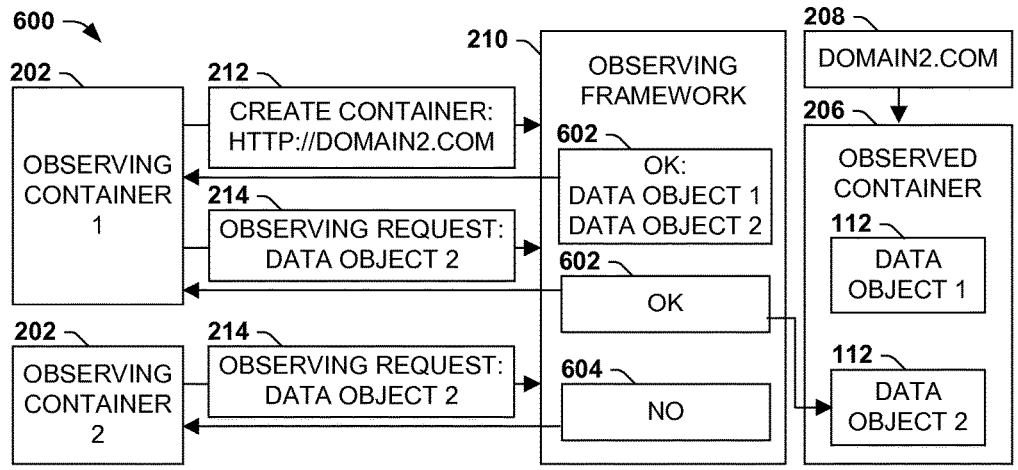
FIG. 6 is an illustration of an example scenario featuring an evaluation of requests of observing containers to observe a data object within an observed container, in accordance with the techniques presented herein.

FIG. 6 presents an illustration of an example scenario 600 featuring several such techniques for establishing the observation of data objects 506 on behalf of observing containers 202. In this example scenario 600, a first observing container 202 initiates a creating request 212 to create an observed container 206, and specifies an observed container domain 208 wherein observed container content of the observed container 206 may be found. The observing framework 210 may retrieve the observed container content from the observed container domain 208, and may create the observed container 206 with the observed container content on behalf of the first observing domain 202. The observing framework 210 may also detect two data objects 112 within the observed container 206 that are available for observation by the observing container 202, and may transmit to the observing container 202 (e.g., through a communication interface 118) an acknowledgment 602 of the creation of the observed container 206, and a list of observable data objects 112 within the observed container 206. Upon receiving an observing request 214 from the observing container 202 that specifies the second data object 112, the observing framework 210 may verify that the observed container 202 is authorized to observe the observed container 206 (e.g., the requesting observing container 202 has a parent/child relationship with the observed container 206), and may then initiate monitoring of the data object 112 on behalf of the observed container 202 and transmit an acknowledgment 602 of the observing request 214 to the observing container 202. Additionally, when a second observing container 202 initiates an observing request 214 to observe the observed container 206, the observing framework 210 may determine that the second observing container 202 is not authorized to observe the observed container 206, and may therefore transmit a refusal 604 of the observing request 214 to the second observing container 202. Many such variations may be utilized to receive and creating requests 212 to create observed containers 206, and/or observing requests 214 to observe data objects 112 within such observed containers 206, in accordance with the techniques presented herein.

E3. Update Notification

A third aspect that may vary among embodiments of the techniques presented herein relates to the manner of notifying an observing container 202 of an update 218 to a data object 112.

As a first variation of this third aspect, an observing request 214 by an observing container 202 may further specify a notification callback function of the observing container 202 to be invoked upon detecting an update 218 of a data object 112. Accordingly, the observing framework 210 may notify the observing container 202 of the update 218 of the data object 112 by invoking the notification callback function of the observing container 202. As one such example, the observing request 214 of the observing container 202 may specify a notification callback name of the notification callback function, which the observing framework 210 may store, and may later use to notify the observing container 202 of the update 218 by initiating a message through the communication interface 118 that specifies the notification callback name of the notification callback function.

As a second variation of this third aspect, the observing framework 210 may include various types of information in the update notification 222. As a first such example, the observing framework 210 may notify the observing container 202 only that the update 218 of the data object 112 has occurred; and may only provide the content of the update 218 to the observing container 202 only responsive to receiving a request from the observing container 202 to provide the update 218. Alternatively or additionally, the update notification 202 may include the update 218 of the data object to the observing container. As a first such example, the observing framework 210 may transmit the entire update 218 to the observing container 202. As a second such example, to the observing container 202, through the communication interface 118, only a delta of the update 218, which may be produced by comparing a previous version of the data object 112 before the update 218 with the updated version of the data object 112.

As a third variation of this third aspect, the update notification 222 transmitted to the observing container 202 may involve updating an observing container version of the data object 112. For example, the observing container 202 may contain a synchronized or cached version of the data object 112, and the observing framework 210 may automatically apply the update 218 received through the communication interface 118 to the observing container version of the data object 112 within the observing container 202.

As a fourth variation of this third aspect, the observing framework 210 may permit the observing container 202 to observe the data object 112 in a unidirectional or read-only manner. Alternatively, the observing framework 210 may permit the observing container 202 to update the data object 112 stored within the observed container 206. As a first such example, the observing framework 210 may receive a second update 218 of the data object 112 from the observing container 202, and may transmit the second update 218 to the observed container 206 through the communication interface 118, and apply the second update 218 to the data object 112 within the observed container 206. As a second such example, the observing container 202 may further comprise an observing container version of the data object 112. The observing framework 210 may also monitor the observing container version of the data object 112 to detect the second update, and, responsive to detecting such a second update 218 of the observing container version of the data object 112, transmit the second update 218 to the observed container 206 for application to the data object 112.

As a fifth variation of this third aspect, the observing framework 210 may enable many other features in the update notification 222 and the application of updates 218 to the data object t112. As a first such example, the observing framework 210 may serialize the update 218 for transmission through the communication interface 118 (e.g., converting a binary representation of the update 218 to a string representation that may be transmitted through a string-based messaging interface). As a second such example, the observing framework 210 may enable pagination of the update 218 (e.g., segmenting the update 218 into a series of messages that may be individually transmitted through the communication interface 118, and reconstituted upon receipt by the observing container 202). As a third such example, the observing framework 210 may timestamp and/or encrypt and/or cryptographically sign the update 218 in order to inform the observing container 202 of the circumstances and/or authenticity of the update 218. As a fourth such example, the observing framework 210 may utilize checkpointing, batching, and/or throttling to provide efficient notification of a frequently and/or continuously updating data object 112. As a fifth such example, the observing framework 210 may enable prioritization of update notifications 222 (e.g., only sending certain types of update notifications 222 to the observing container 202 that reflect certain types of updates 218, such as distinguishing semantically significant updates, such as changing data, from semantically trivial updates, from reorganizing data), and/or prioritization based upon the identities of the observing containers 202, observed containers 206, and/or data objects 112 (e.g., transmitting a first update notification 222 before a second update notification 222 based on the observing containers 202, observed containers 206, and/or data objects 112 involved therein). As a sixth such example, the observing framework 210 may enable multicasting of notification updates 222 (e.g., permitting an data object 112 to be observed by a large number of observing containers 202, and/or enabling an observing container 202 to observe a large number of data objects 112). As a seventh such example, the observing framework 210 may store update notifications 222 in a log or journal, e.g., in order to permit observing containers 202 to review the history of updates 218, to select a previous version of the data object 112, and/or to recover from data loss. Many such additional features may be included in the observing framework 210 to facilitate the transmission of notification updates 222 through the communication interface 118.

Figure 7:
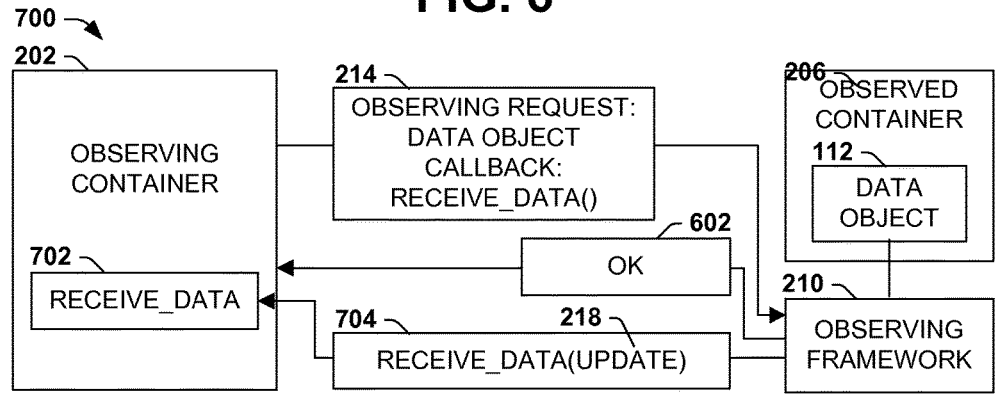
FIG. 7 is an illustration of an example scenario featuring a first technique for notifying an observing container of an update to a data object within an observed container, in accordance with the techniques presented herein.

FIG. 7 presents an illustration of an example scenario 700 featuring a first technique for notifying an observing container 202 of an update 218 of a data object 112 within an observed container 206. In this example scenario 700, the observing container 202 includes a notification callback 702 having a particular notification callback name, which the observing container 202 includes in the observing request 214 presented to the observing framework 210. The observing framework 210 receives the observing request 214, notes the notification callback name, and transmits an acknowledgment 602 of the observing request 214 to the observing container 202. Thereafter, upon detecting an update 218 of the data object 112 within the observed container 206, the observing framework 210 transmits an update notification 222 to the observing container 202, and does so as an invocation of the notification callback 702 identified by the notification callback name, while also transmitting the update 218 of the data object 112 as part of the invocation of the notification callback 702.

Figure 8:
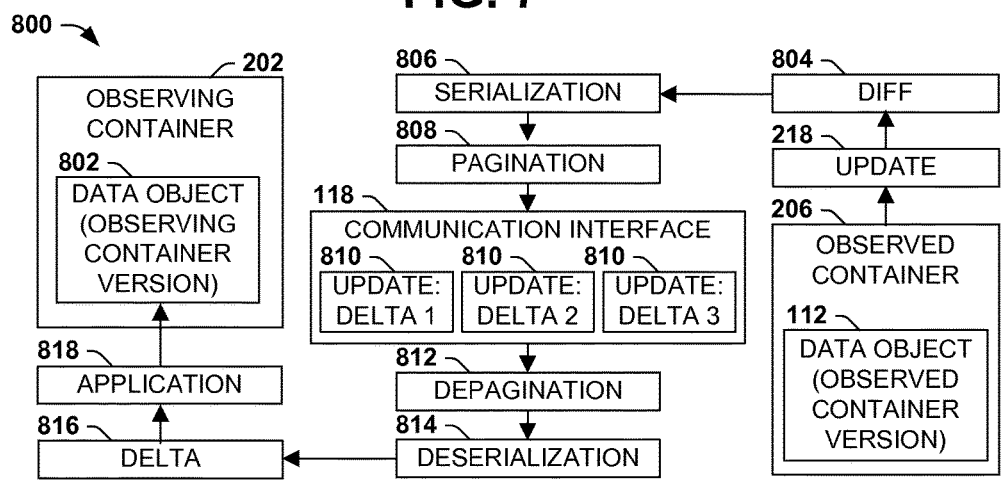
FIG. 8 is an illustration of an example scenario featuring a second technique for notifying an observing container of an update to a data object within an observed container, in accordance with the techniques presented herein.

FIG. 8 presents an illustration of an example scenario 800 featuring a second technique for notifying an observing container 202 of an update 218 of a data object 112 within an observed container 206. In this example scenario 800, the observing container 202 includes an observing container version 802 of a data object 112 stored within an observed container 206. Upon detecting an update 218 of the data object 112, the observing framework 210 may first apply a diff operation 804 to identify a delta representing the update 218. The observing framework 210 may then serialize 806 the delta for transmission through the communication interface 118, and may then paginate 808 the delta (e.g., segmenting the delta into a set of smaller deltas 810 within a size threshold), and transmit the paginated deltas 810 through the communication framework 118. Upon receiving the paginated deltas 810, the observing framework 210 may depaginate 812 the paginated deltas 810 (e.g., through concatenation) and deserialize 814 the depaginated delta to regenerate the original delta 818, which may then be applied 818 automatically to the observing container version 802 of the data object 112. In this manner, the observing framework 210 may achieve the synchronization of the observing container version 808 and the observed container version of the data object 112. Many such techniques may be utilized to achieve the notification of the observing container 202 of the update 218 of the data object 112 within the observed container 206 in accordance with the techniques presented herein.

F. Computing Environment

Figure 9:
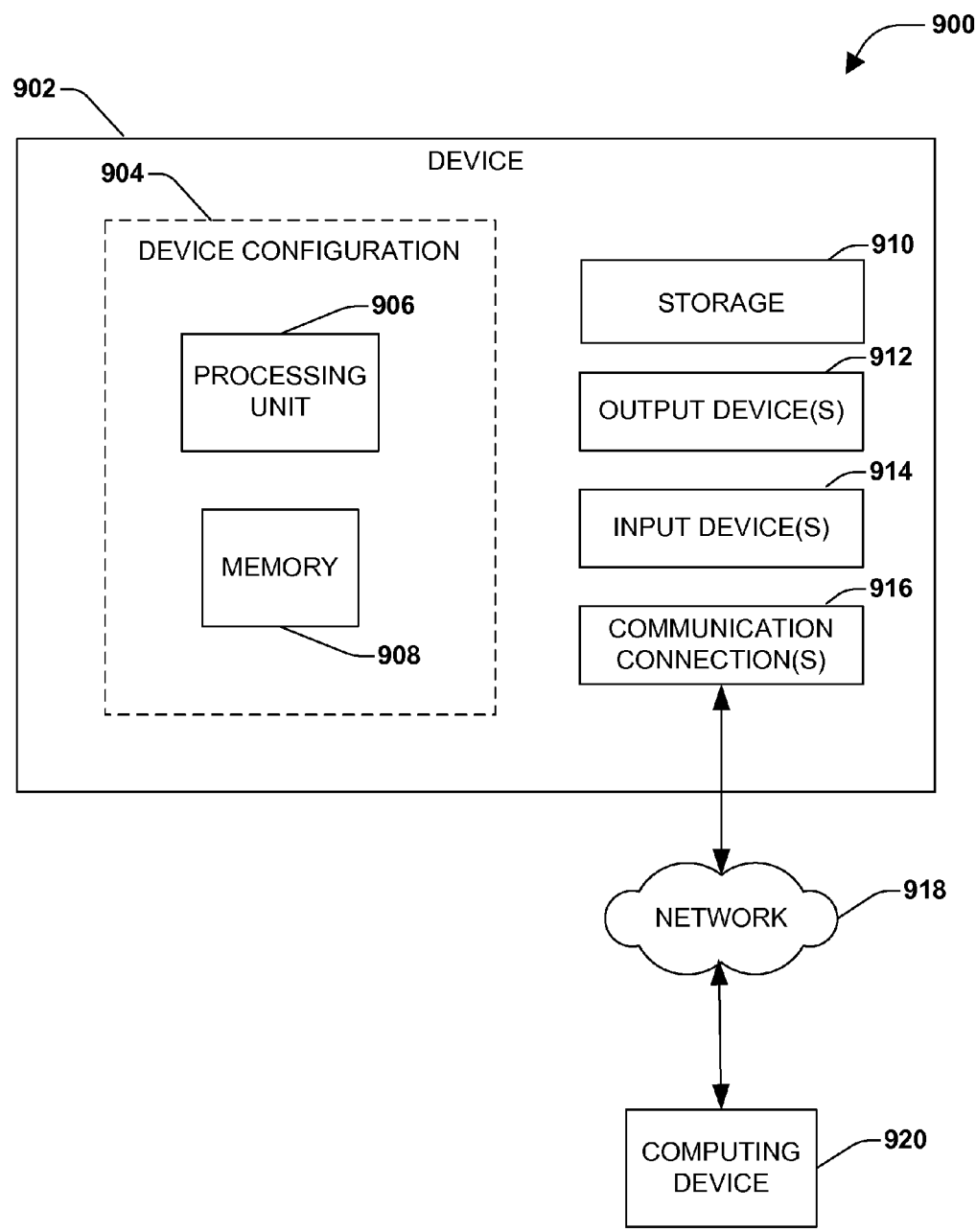
FIG. 9 is an illustration of an example computing environment wherein one or more of the provisions set forth herein may be implemented.

FIG. 9 and the following discussion provide a brief, general description of a suitable computing environment to implement embodiments of one or more of the provisions set forth herein. The operating environment of FIG. 9 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 9 illustrates an example of a system 900 comprising a computing device 902 configured to implement one or more embodiments provided herein. In one configuration, computing device 902 includes a processing unit 906 and memory 908. Depending on the exact configuration and type of computing device, memory 908 may be volatile (such as RAM, for example), non-volatile (such as ROM, flash memory, etc., for example) or some combination of the two. This configuration is illustrated in FIG. 9 by dashed line 904.

In other embodiments, device 902 may include additional features and/or functionality. For example, device 902 may also include additional storage (e.g., removable and/or non-removable) including, but not limited to, magnetic storage, optical storage, and the like. Such additional storage is illustrated in FIG. 9 by storage 910. In one embodiment, computer readable instructions to implement one or more embodiments provided herein may be in storage 910. Storage 910 may also store other computer readable instructions to implement an operating system, an application program, and the like. Computer readable instructions may be loaded in memory 908 for execution by processing unit 906, for example.

The term "computer readable media" as used herein includes computer-readable memory devices that exclude other forms of computer-readable media comprising communications media, such as signals. Such computer-readable memory devices may be volatile and/or nonvolatile, removable and/or non-removable, and may involve various types of physical devices storing computer readable instructions or other data. Memory 908 and storage 910 are examples of computer storage media. Computer-storage storage devices include, but are not limited to, RAM, ROM, EEPROM, flash memory or other memory technology, CD-ROM, Digital Versatile Disks (DVDs) or other optical storage, magnetic cassettes, magnetic tape, and magnetic disk storage or other magnetic storage devices.

Device 902 may also include communication connection(s) 916 that allows device 902 to communicate with other devices. Communication connection(s) 916 may include, but is not limited to, a modem, a Network Interface Card (NIC), an integrated network interface, a radio frequency transmitter/receiver, an infrared port, a USB connection, or other interfaces for connecting computing device 902 to other computing devices. Communication connection(s) 916 may include a wired connection or a wireless connection.

Communication connection(s) 916 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 902 may include input device(s) 914 such as keyboard, mouse, pen, voice input device, touch input device, infrared cameras, video input devices, and/or any other input device. Output device(s) 912 such as one or more displays, speakers, printers, and/or any other output device may also be included in device 902. Input device(s) 914 and output device(s) 912 may be connected to device 902 via a wired connection, wireless connection, or any combination thereof. In one embodiment, an input device or an output device from another computing device may be used as input device(s) 914 or output device(s) 912 for computing device 902.

Components of computing device 902 may be connected by various interconnects, such as a bus. Such interconnects may include a Peripheral Component Interconnect (PCI), such as PCI Express, a Universal Serial Bus (USB), Firewire (IEEE 1394), an optical bus structure, and the like. In another embodiment, components of computing device 902 may be interconnected by a network. For example, memory 908 may be comprised of multiple physical memory units located in different physical locations interconnected by a network.

Those skilled in the art will realize that storage devices utilized to store computer readable instructions may be distributed across a network. For example, a computing device 920 accessible via network 918 may store computer readable instructions to implement one or more embodiments provided herein. Computing device 902 may access computing device 920 and download a part or all of the computer readable instructions for execution. Alternatively, computing device 902 may download pieces of the computer readable instructions, as needed, or some instructions may be executed at computing device 902 and some at computing device 920.

G. Usage of Terms

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Any aspect or design described herein as an "example" is not necessarily to be construed as advantageous over other aspects or designs. Rather, use of the word "example" is intended to present one possible aspect and/or implementation that may pertain to the techniques presented herein. Such examples are not necessary for such techniques or intended to be limiting. Various embodiments of such techniques may include such an example, alone or in combination with other features, and/or may vary and/or omit the illustrated example.

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated example implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of coordinating domain-restricted containers on a device having a processor, the method comprising:
   executing, on the processor, instructions that cause the device to:
      responsive to receiving, from an observing container that is an isolation construct and that is restricted to an observing container domain, a creating request to create an observed container that is an isolation construct and that is restricted to an observed container domain:
         create the observed container, and
         provide a communication interface that enables communication between the observing container and the observed container within the device; and
      responsive to receiving an observing request from the observing container to observe a data object within the observed container:
         monitor the data object on behalf of the observing container; and
         responsive to detecting an update of the data object within the observed container, notify the observing container through the communication interface of the update of the data object.

2. The method of claim 1, wherein executing the instructions further causes the device to, responsive to receiving an observing request from an observing container to observe a second data object in a second container that is not associated with the observing container domain and was not created by the observing container, refuse the observing request by the observing container to observe the second container.

3. The method of claim 1, wherein:
   the creating request by the observing container specifies an observed container content of the observed container including the data object; and
   receiving the observing request from the observing container further comprises: receiving the creating request from the observing container to create the observed container content including the data object.

4. The method of claim 3, wherein:
   the creating request by the observing container further comprises a content location of the observed container content; and
   creating the observed container further comprises:
      loading the observed container content from the content location; and
      creating the observed container according to the observed container content.

5. The method of claim 1, wherein:
   the observing container further comprises an observing container version of the data object; and
   receiving the observing request further comprises: receiving, from the observing container, a creating request to synchronize the data object of the observed container with the observing container version of the data object.

6. The method of claim 1, wherein creating the observed container further comprises: notifying the observed container domain of the data object of the observed container that is observable by the observing container.

7. The method of claim 1, wherein executing the instructions further causes the device to notify the observing container of observable data objects within the observed container.

8. The method of claim 7, wherein notifying the observing container further comprises: responsive to receiving, from the observing container domain, a notification of observable data objects within the observed container, transmit the notification to the observing container.

9. A memory device storing instructions that, when executed on a processor of a computing device, cause the computing device to coordinate domain-restricted containers, by:
responsive to receiving, from an observing container that is an isolation construct and that is restricted to an observing container domain, a creating request to create an observed container that is an isolation construct and that is restricted to an observed container domain:
creating the observed container, and
providing a communication interface that enables communication between the observing container and the observed container within the computing device; and
responsive to receiving an observing request from the observing container to observe a data object within the observed container:
monitoring the data object on behalf of the observing container; and
responsive to detecting an update of the data object within the observed container, notifying the observing container through the communication interface of the update of the data object.

10. The memory device of claim 9, wherein:
the creating request by the observing container further specifies a notification callback function of the observing container; and
notifying the observing container of the update of the data object further comprises:
responsive to detecting the update of the data object within the observed container, invoking the notification callback function of the observing container.

11. The memory device of claim 10, wherein:
the observing request by the observing container specifies a notification callback name of the notification callback function; and
invoking the notification callback function further comprises: initiating a message through the communication interface specifying the notification callback name of the notification callback function.

12. The memory device of claim 9, wherein:
notifying the observing container of the update of the data object further comprises: notifying the observing container that the update of the data object has occurred; and
executing the instructions further causes the computing device to, responsive to receiving a request from the observing container to provide the update, provide the update of the data object to the observing container.

13. The memory device of claim 9, wherein notifying the observing container of the update of the data object further comprises: transmitting the update of the data object to the observing container.

14. The memory device of claim 13, wherein transmitting the update further comprises:
generating a delta of the update of the data object from a previous version of the data object before the update; and
transmitting only the delta of the update to the observing container.

15. The memory device of claim 9, wherein:
the observing container further comprises an observing container version of the data object; and
executing the instructions further causes the computing device to, responsive to detecting the update of the data object, apply the update to the observing container version of the data object.

16. The memory device of claim 9, wherein executing the instructions further causes the computing device to, responsive to receiving a second update of the data object from the observing container, apply the second update to the data object within the observed container.

17. The memory device of claim 16, wherein:
the observing container further comprises an observing container version of the data object;
executing the instructions further causes the computing device to monitor the observing container version of the data object to detect the second update; and
receiving the second update of the data object further comprises: detecting the second update of the observing container version of the data object.

18. A device that coordinates domain-restricted containers, comprising:
a processor; and
a memory storing:
a virtual environment hosting an observing container that is an isolation construct and that is restricted to an observing container domain, and an observed container that is an isolation construct and that is restricted to an observed container domain; and
instructions that, when executed on the processor, provide a system comprising:
a communication interface that enables communication between the observing container and the observed container within the device; and
an observing interface that:
responsive to receiving an observing request from the observing container to observe a data object within the observed container, monitors the data object on behalf of the observing container; and
responsive to detecting an update of the data object within the observed container, notifies the observing container through the communication interface of the update of the data object.

19. The device of claim 18, wherein the communication interface further comprises a string messaging interface that enables exchange of string messages between the observing container and the observed container.

20. The device of claim 19, wherein notifying the observing container of the update through the communication interface further comprises:
serializing the update from the observed container into a string-serialized update message;
transmitting the string-serialized text message through the string messaging interface from the observed container; and
responsive to receiving the string-serialized update message for the observing container through the string messaging interface:
deserializing the string-serialized update message to regenerate the update; and
deliver the update to the observing container.

* * * * *